Patented July 2, 1946

2,403,010

UNITED STATES PATENT OFFICE 2,403,010

STABILIZED COMPOSITION AND METHOD

Brack B. McHan, Quincy, Ill., assignor to Calcium Carbonate Company, Chicago, Ill., a corporation of Illinois No Drawing. Application March 12, 1943, Serial No. 478,938

9 Claims. (Cl. 99—2)

This invention relates to the stabilization of chemical compounds. More particularly, it pertains to the stabilization of calcium compounds, such as limestone, to be used as an ingredient, for example, in food products, or the like, without fear that it will materially destroy the vitamin content or develop rancidity in the remaining ingredients, and this is a principal object of the invention.

Calcium carbonate, in the form of ground limestone, is a commonly used ingredient in feed mixtures. It is used in percentages varying from 1 per cent to 5 per cent. Calcium carbonate is a necessary component of the diet. The addition of calcium carbonate is necessary in order to maintain the correct balance or ratio of calcium and phosphorus and to insure the normal development of the skeletal structure as well as to maintain the necessary balance of calcium in the blood stream and the other organic portions of the normal animal structure.

To supply the necessary calcium requirement it is common practice of feeders of all classes of livestock to introduce into the mixed feed a necessary quantity of calcium. This is usually introduced in the form of pulverized limestone. It is also conventional practice to fortify feed products with various vitamin concentrates in order to insure a necessary amount of these very important ingredients being present at all times. Vitamin A may be added in the form of carotene, various fish oils, or alfalfa meal. Vitamin D is usually added by means of one of the fish liver oils, or by any other suitable means. Most of the common forms of feed stuff, such as alfalfa hay or meal, corn meal (especially yellow corn meal), grains and grain products, carry varying percentages of various vitamins and oils. Vitamins are very readily destroyed by processes of oxidation. As an example, the vitamin A content of alfalfa meal will be reduced as much as 50 per cent in less than two months' time due to oxidation of the vitamin A molecule.

The oils present in the natural feed stuffs also undergo processes of oxidation resulting in the development of varying degrees of rancidity. The rancid odor developed through oxidation of the oils impairs the attractiveness and palatability of the food, and greatly reduces its biological activity by the accompanying destruction of vitamins. The development of rancidity is accompanied by the development of substances known as peroxides; these peroxides in turn further oxidize the vitamins, oils, and natural enzymes of feed materials.

Generally, it is an object of the present invention to overcome the foregoing and other difficulties and disadvantages by effectively lowering the oxidation-reduction potential of useful compounds, i. e. inorganic as well as organic, the latter comprising animal and vegetable products, generally in a finely comminuted condition, by treatment of such compounds with a suitable stabilizer.

More specifically, an object of the invention is to provide a composition of matter and method of treatment for producing the same comprising calcium carbonate and a chemical compound adsorptively combined therewith over its reactive area, such a material preferably being chosen from a group consisting of iodine, phosphorus, or sulfur compounds and preferably with the addition of an alkali, and reacting the same with the calcium carbonate to provide a composition having as its essential property an adsorption isotherm of such characteristics that oxygen adsorbed by said calcium carbonate is replaced and further adsorption of oxygen by said carbonate is prevented, to the end that the composition when used as an ingredient of food, or the like, will not destroy vitamins present nor cause the development of rancidity.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the application of which will be indicated in the claims.

The present problem of the causes of the development of rancidity and destruction of vitamins in food products as above set forth, has long confronted the industry and solutions thereto have constantly been sought. No one familiar with the chemistry of calcium carbonate would attribute thereto a high oxidizing capacity. Indeed, a contrary view has inevitably obtained. The molecule of calcium carbonate is an extremely stabile one with the oxygen molecules so tightly bound that they would not be transferred in any ordinary processes of oxidation. This statement is susceptible to both chemical and thermodynamic proof. Hence, this material has heretofore been eliminated as being among the chief causes to give rise to the problem.

The present invention, however, is based on my discovery that calcium carbonate is the primary cause of vitamin destruction and rancidity development. I have found that during the processes of grinding and attrition of the calcium carbonate, the surfaces of the particles presented unsaturated chemical bonds which picked up, at activated points, oxygen atoms from the air. Also, that the oxidizing action of the adsorbed oxygen on the surface of the limestone particles could completely be nullified or replaced by some substance preferentially adsorbed over the oxygen, and that the chemical nature of this substance must have an adsorption isotherm that would effectively prevent the limestone from adsorbing further oxygen on storage.

It was further observed that on many of the surfaces of the calcium carbonate particles the oxygen atom may be closely compacted and in a highly reactive state. When a particle of calcium carbonate carrying its charge of adsorbed oxygen atoms, comes into contact with an oxidizable substance, these oxygen atoms are transferred and the substance oxidized. It has also been noted that very quickly after mixing an oxidizable substance with calcium cabonate, such, for example, as vitamin A, fish oils, or carotene, that 90 per cent plus will be oxidized. This, however, does not neutralize the oxidizing capacity of the calcium carbonate as these activated points on the crystal simply pick up more oxygen atoms from the air and again transfer them to oxidizable substances. This process goes on until the oxidizable substance has been completely saturated with oxygen.

As a result of these combined discoveries and observations the problem at hand has been solved by a process of subjecting the calcium carbonate to the action of a suitable stabilizing agent which, by adsorption, effectively will reduce the oxidation-reduction potential, either before, during or after grinding. Several actual processes of treatment will now be described as set forth in the following examples:

Example 1

Calcium carbonate, one ton, was ground in an atmosphere containing 0.5 per cent of a sulfur dioxide gas. (As an alternative, equal amounts of calcilum carbonate were ground and after leaving the mill were mixed in an atmosphere of a similar amount of sulfur dioxide gas.) This gas in each instance caused a drop in the oxidation-reduction potential of the calcium carbonate corresponding to Example 1 with the result that it also had a high stabilizing effect on vitamins and vitamin products and did not develop rancidity in oils or fats. Subsequent developments demonstrated that it is not necessary to grind the limestone or calcium carbonate in or mix it in an atmosphere of pure sulfur dioxide gas, but an atmosphere containing less than 1 per cent of the gas is sufficient substantially to reduce the oxidation-reduction potential, and cause the resulting stone to have a stabilizing action towards vitamins, oils, and fats.

Example 2

Hydrogen sulfide gas, 0.5 per cent, was mixed with limetsone particles, one ton, during the process of grinding. (Similar amounts of each were also mixed subsequent to grinding). It was found that the hydrogen sulfide gas was adsorbed on the surface of the particles and that a very substantial reduction of oxidation-reduction potential was secured. This reduction also proved sufficient to exert a high degree of stabilizing action on vitamins, fats, and oils.

Example 3

Manganese compounds, such as, for example, manganese sulfate, is a commonly used ingredient in feed stuffs. Through processes of hydrolysis it becomes a powerful oxidizing agent. When mixed with treated limestone carrying sulfur dioxide (as per Example 2) it was observed that the oxidizing capacity of the manganese sulfate was effectively inhibited.

Subsequent trials under actual operating conditions demonstrated that when an excess of an alkali containing an active hydroxyl group, for example, sodium hydroxide, potassium hydroxide, calcium hydroxide, magnesium hydroxide is introduced into the limestone along with reagents such as those, among others, given in the preceding examples, a further very substantial reduction of the oxidation-reduction potential was secured.

With respect to the relative weights of materials used, it has been found that sulfur compounds generally are effective in percentages ranging from 0.1 per cent to 0.5 per cent, which is equivalent to two pounds and ten pounds per ton of limestone respectively. While this is a preferred range, desirable results have been secured from percentages varying from 0.01 per cent up to 1.0 per cent.

Sulfur dioxide gas percentages as low as 0.01 per cent proved quite effective. The limiting ranges with respect to this material, a chief function of which is to replace the adsorbed oxygen on the surface of the limestone particles, is a range of about 0.01 per cent up to about 0.3 per cent which is equivalent to 0.2 of a pound per ton up to four pounds per ton of limestone.

Hydrogen sulfide gas can be used in approximately the same percentages and weights as sulfur dioxide gas.

It has also been discovered that phosphorous compounds will retard the development of rancidity and prevent subsequent destruction of the vitamin content. This is particularly true of the salts of phosphorous acid.

In addition to the foregoing, and besides the sulfur compounds already described, other sulfur compounds have been discovered that will substantially lower the oxidation-reduction potential. For example, elemental sulfur, in very small percentages of the order of a few hundredths up to 0.1 per cent of colloidal sulfur, or any other very finely divided elemental sulfur, reduces the redox potential and subsequent oxidizing capacity of calcium carbonate. The sulfur should be precipitated directly into, or either onto, a stream of rock being fed to the mill thereby securing thorough mixing and incorporation with the resulting finely ground calcium carbonate. Other compounds containing sulfur groups which have proven very satisfactory for practicing the present invention are sodium sulfite or sodium acid sulfite, calcium sulfide, aluminum sulfide, alkaline sulfides, alkaline earth sulfides, aluminum and silica sulfides, sulfites and bisulfites, alkalines, formaldehyde-sulphoxylates, polythionates, the salts of hydrosulfurous acid and the hydrosulfites.

The sulfur group has proven to be by far the most effective group used. Its activity as an oxidation-reduction potential inhibitor in preventing development of rancidity and subsequent destruction of vitamins by oxygen carrying calcium compounds is an important part of my discovery on which the success of the present invention is founded.

From all of the foregoing uses, and others, it appears that any chemical compound or reagent, used in accordance with the teachings of the present invention, and which possesses the property of a high degree of adsorption on limestone particles, that is, having an adsorption isotherm of such characteristic that it would cause them to replace the adsorbed oxygen, and which would effectively prevent any further adsorption of oxygen by the calcium carbonate particles, will act as an effective stabilizer.

The oxidation-reduction potential in all cases was measured by means of a potentiometer and it should be noted that in order to secure the best results, a redox potential value of preferably +0.3 should not be exceeded.

It should further be noted that the present invention contemplates adaption to other fields of industrial usage. The property of undergoing spontaneous oxidation when exposed to the atmosphere is by no means peculiar to edible fats, but is exhibited also by many other substances of biological and industrial importance. For example, cases outside of the field of the preservation of food are the aging or perishing of rubber, the formation of gum in gasoline, production of sludge in mineral, lubricating and transformer oils, and the oxidation and resinification of essential oils.

In addition to the foregoing, prevention of the development of rancidity and vitamin loss and vitamin-carrying substances are important in the pharmaceutical trade as, for instance, the inclusion of vitamins in tablets or capsules where various substances are used as carriers.

The invention can also be adapted in the field of paint and paint oils where many calcium carbonates when mixed with certain types of oils accelerate the oxidation thereof. In addition to calcium carbonate, other finely ground powders, such as lithopone, white lead, Titanox, china clay, and barytes, can thus be treated.

It will thus be seen that the objects hereinbefore set forth may readily and efficiently be attained, and since changes when carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

Having described my invention, what I claim as new and desire to secure by Letters Patent is:

1. In a feed product a composition comprising calcium carbonate carrying adsorbed oxygen and an oxidation-reduction potential reducing reagent selected from the group of materials consisting of sulfur dioxide, sodium sulfide, calcium sulfide, potassium sulfide and elemental sulfur, and a vitamin concentrate.

2. A stabilized composition of matter comprising discrete particles of calcium carbonate, and an oxidation-reduction potential reducing substance selected from the group of materials consisting of sulfur dioxide, sodium sulfide, calcium sulfide, potassium sulfide and elemental sulfur.

3. A stabilized composition of matter comprising discrete particles of calcium carbonate, an oxidation-reduction potential reducing substance selected from the group of materials consisting of sulfur dioxide, sodium sulfide, calcium sulfide, potassium sulfide and elemental sulfur, and an alkali selected from the group consisting of sodium hydroxide, potassium hydroxide, calcium hydroxide and magnesium hydroxide.

4. A process of producing a stabilized composition of matter, which comprises adding to discrete particles of calcium carbonate an oxidation-reduction potential substance selected from the group of materials consisting of sulfur dioxide, sodium sulfide, calcium sulfide, potassium sulfide and elemental sulfur.

5. A process of producing a stabilized composition of matter, which comprises adding to discrete particles of calcium carbonate an oxidation-reduction potential substance selected from the group of materials consisting of sulfur dioxide, sodium sulfide, calcium sulfide, potassium sulfide and elemental sulfur and an alkali selected from the group consisting of sodium hydroxide, potassium hydroxide, calcium hydroxide and magnesium hydroxide.

6. A stabilized composition of matter comprising discrete particles of calcium carbonate, and a colloidal sulfur as an oxidation-reduction potential reducing substance, said substance preferentially being adsorbed over oxygen reaction areas of said calcium carbonate.

7. A process of producing a stabilized composition of matter, which comprises mixing discrete particles of calcium carbonate with coloidal sulfur as an oxidation-reduction potential reducing substance until said substance preferentially is substantially completely adsorbed over oxygen reaction areas of said calcium carbonate.

8. A stabilized composition of matter comprising discrete particles of calcium carbonate, and a material selected from the group consisting of sulfur dioxide, sodium sulfide, calcium sulfide, potassium sulfide and elemental sulfur, and the percentage of the material selected being based on the weight of the calcium carbonate and not to exceed 1.0 per cent.

9. A process of producing a stabilized composition of matter, which comprises mixing discrete particles of calcium carbonate with a material selected from the group consisting of sulfur dioxide, sodium sulfide, calcium sulfide, potassium sulfide and elemental sulfur, the weight of the material selected being based on the weight of the calcium carbonate and not to exceed 1.0 per cent.

BRACK B. McHAN.